July 5, 1927.
C. M. LINLEY
1,634,428
METHOD OF AND APPARATUS FOR TESTING THE DYNAMIC BALANCE OF ROTARY BODIES
Filed March 26, 1926 3 Sheets-Sheet 2
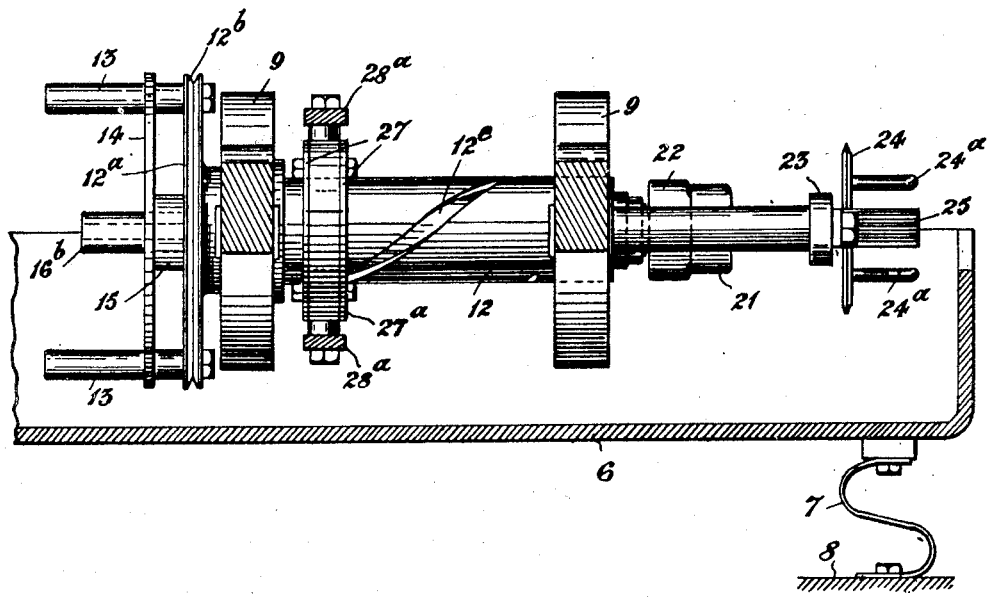
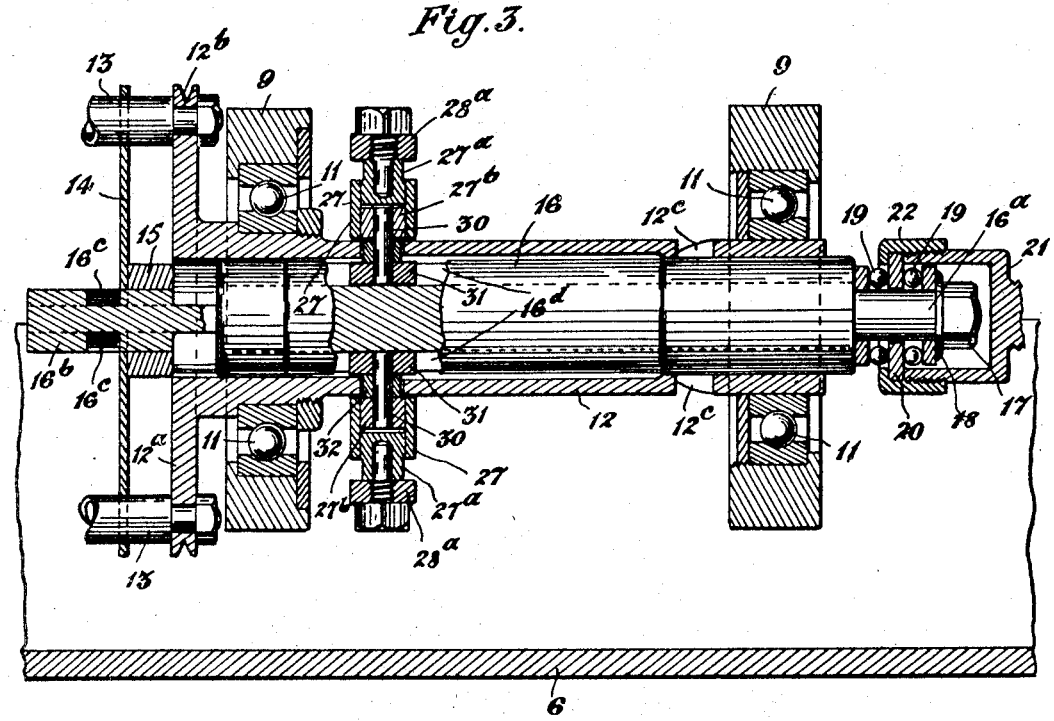
Fig. 3.
Inventor:—
Charles M. Linley
by George C. Folkes
his Attorney.

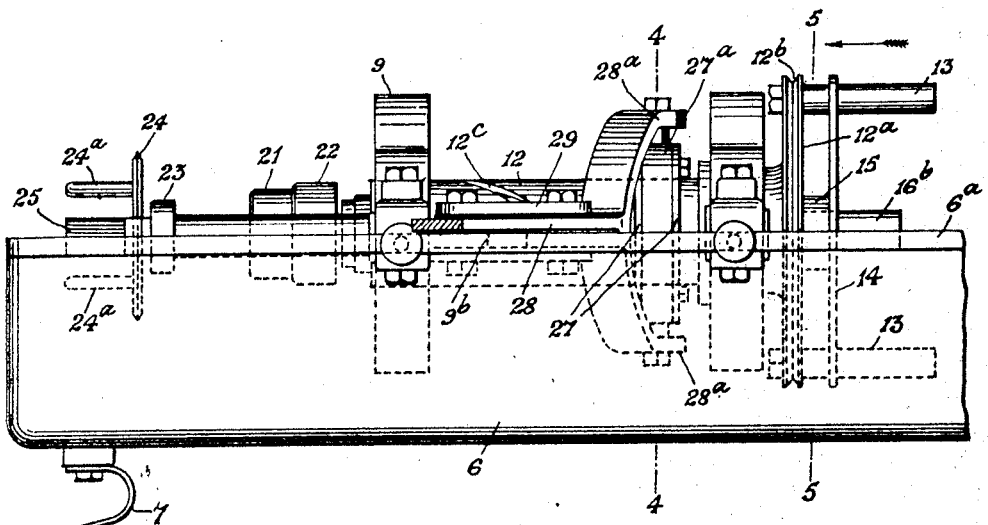
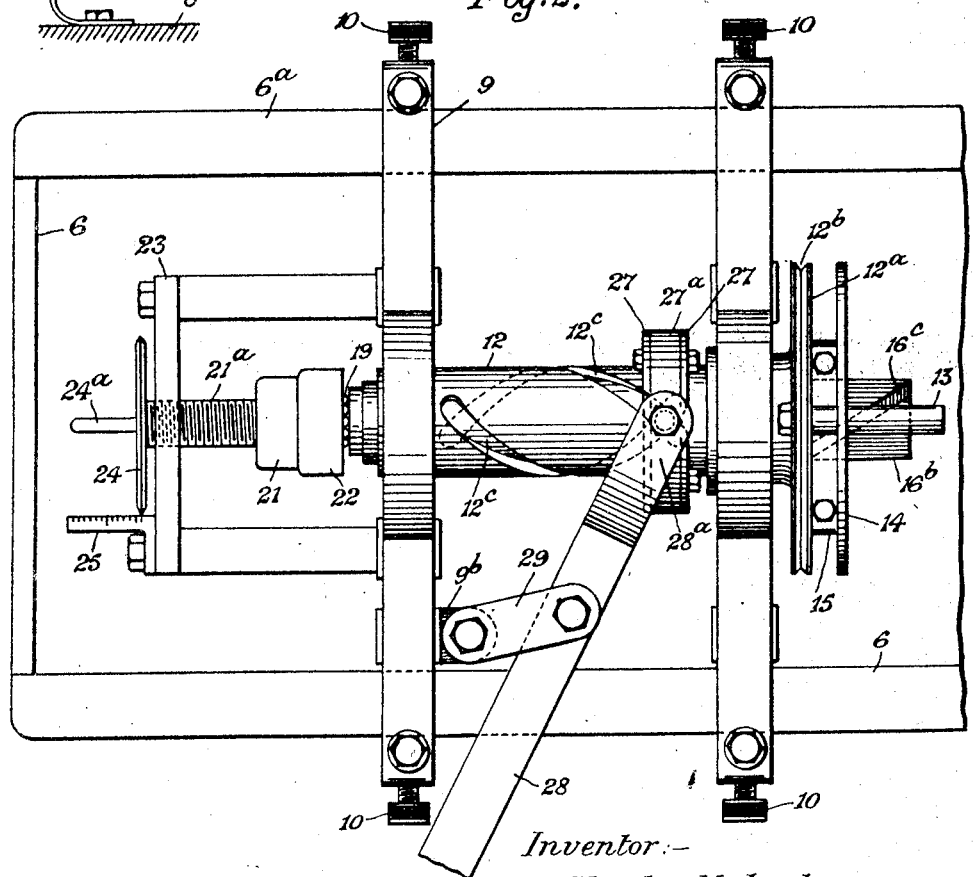

July 5, 1927.  1,634,428
C. M. LINLEY
METHOD OF AND APPARATUS FOR TESTING THE DYNAMIC BALANCE OF ROTARY BODIES
Filed March 26, 1926   3 Sheets-Sheet 3

Inventor:—
Charles M. Linley
by George C. Folker
his Attorney

Patented July 5, 1927.

1,634,428

UNITED STATES PATENT OFFICE.

CHARLES MONTAGUE LINLEY, OF HIGHBURY, LONDON, ENGLAND, ASSIGNOR TO W. & T. AVERY LIMITED, OF BIRMINGHAM, ENGLAND, A CORPORATION OF GREAT BRITAIN.

METHOD OF AND APPARATUS FOR TESTING THE DYNAMIC BALANCE OF ROTARY BODIES.

Application filed March 26, 1926, Serial No. 97,708, and in Great Britain March 30, 1925.

The present invention has reference to an improved method of and apparatus for testing the dynamic balance of rotary bodies, and has for its objects the provision of a method of testing the balance of a rotary body which admits of the test being carried out during the rotation of the body and simulation of the virtual conditions under which the body will work in practice, the apparatus therefor being simple in construction and operation and admitting of the degree of out of balance and the point of its occurrence readily to be obtained. This apparatus is particularly applicable for use in connection with the testing of crank-shafts or rotors.

The invention consists of an improved method of and apparatus for testing the balance of rotary bodies and is characterized by the employment of an eccentrically displaceable member the degree of eccentricity whereof relative to the rotary body under test can be varied to compensate for and counteract the errors of running produced by a lack of balance of the said body during rotation, means being provided for ascertaining the degree of out of balance and the point of its occurrence, the apparatus comprising a bed mounted on a plurality of resiliently mounted supports, a pair of mandrels carried by the said bed and adapted for connection to the body to be tested, a pair of shafts slidably and rotatably secured within said mandrels, eccentrically displaceable weights operating in conjunction with said shafts and provided with means for varying the degree of eccentricity thereof, and means for obtaining an indication of the eccentricity of the said weights, and means for effecting the rotation of the body. The invention further resides in the details of construction and of the apparatus as a whole.

The invention will now be described with particular reference to the accompanying sheets of drawing, in which:—

Figure 1 is a part sectional front elevation of an apparatus constructed in accordance with the invention, for testing the balance of rotary bodies.

Figure 2 is a plan of the portion of the apparatus seen on the left-hand of Figure 1.

Figure 3 is a part sectional elevation of the portion of the apparatus seen on the right-hand of Figure 1 drawn to a larger scale.

The same numerals of reference indicate the same parts in the several figures of the drawings.

Figure 4:
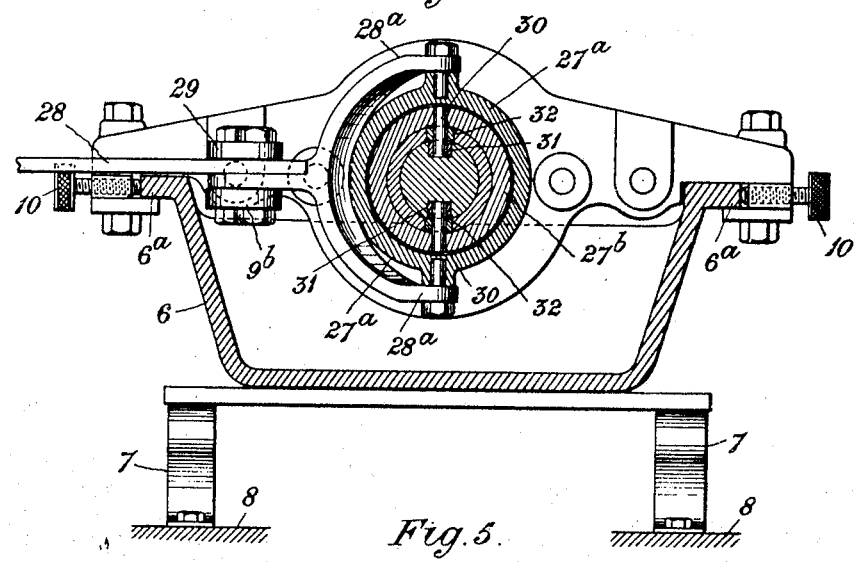
Figure 4 is a part sectional elevation, the section being taken on the line 4—4, Figure 1, and looking in the direction of the arrow in the said figure.

The bed 6 of the apparatus is constituted by a trough-shaped casting which is supported adjacent each corner upon the ends of laminated springs 7, the other ends whereof are anchored to a base 8, the bed 6 being provided along each side with machined guideways 6ª. The apparatus proper is constituted by two similar and identical portions, each portion comprising a pair of bearing members 9 which are slidably mounted on the guideways 6ª, the said members being provided with knurled headed screws 10 whereby the said members 9 may be locked in any position on the guideway 6ª in a manner that will be well understood. Each of the bearing members 9 has a centrally disposed aperture within which is located a ball race 11, said races 11 constituting bearings for a hollow cylindrical mandrel 12. Each mandrel 12 is formed at its inner end with a disc-like section 12ª, the periphery whereof is formed with a notch 12ᵇ adapted to receive a driving belt or the like by means of which the apparatus may be rotated. Secured to the disc 12ª and spaced therefrom by means of distance pieces 13 is an outer disc 14, the inner face whereof and the inner face of the disc 12ª constitute a guide for an eccentrically displaceable weight 15 which is located between the inner faces of the said discs 12ª and 14. Intermediate the two bearing members 9, the wall of the mandrel 12 is formed with a pair of helical grooves 12ᶜ. Disposed within the bore of the mandrel 12 and axially slidable relative thereto is a shaft 16, said shaft being provided at its outer end with a reduced section 16ª on the end whereof is secured by means of a nut 17 a thrust washer 18 adapted to co-operate with ball thrust races 19 which in turn co-operate with a thrust plate 20 secured to a collar 21 by means of a threaded cap 22, said collar 21 being provided with a screwed extension 21ª adapted to engage within a screwed aperture formed in a strap 23 supported from the outermost of the bearing members 9. Secured on the outer end of the screwed extension 21ª is a disc 24 having a V-shaped periphery, said disc being adapted for rotation by means of handles 24ª secured thereto, the periphery of the disc 24 registering with a graduated scale formed on a bracket 25 secured to the strap 23. At its inner end the shaft 16 is provided with a reduced rectangular section 16ᵇ having formed on opposite sides thereof a pair of diametrically opposed inclined grooves 16ᶜ. Within these grooves 16ᶜ are adapted to engage a pair of oppositely opposed projections 15ᵇ formed on the inner faces of a gapped section of the weight 15. The shaft 16 is also provided with a pair of diametrically opposed longitudinal grooves 16ᵈ adapted to co-operate with means hereinafter described whereby the shaft 16 is permitted an axial sliding motion relative to the mandrel 12 but is prevented from having a relative rotary motion to the said mandrel.

Concentrically disposed about each mandrel 12 are a pair of annular members 27 having secured thereto an annular block 27ª to which is pivotally connected the jaws 28ª of a fork-ended lever 28 pivotally connected intermediate its end to a link 29 in turn pivotally connected to a bracket 9ᵇ carried by one of the bearing members 9. Rotatably mounted between the members 27 is an annular block 27ᵇ having fixed therein a pair of diametrically opposed pins or pegs 30 to the lower ends whereof are secured guide pieces 31 adapted to be disposed in and traversed along the longitudinal grooves 16ª formed in the shaft 16. Intermediate the said blocks 31 and the annular member 27 and concentrically disposed about the pins are bushes 32 adapted to engage with the sides of the helical grooves 12ᶜ in the mandrel 12.

It will be seen that the mandrels 12 are capable of rotation relative to the bearing members 9 and that the shafts 16 are capable of an axial sliding movement relative to the mandrels 12 and are also capable of rotation with the mandrels.

A test is carried out in the following manner: Assuming the body to be tested is a crank shaft for an internal combustion engine, the shaft is connected at each end to discs 14 of the mandrels 12 and in this connection it will be observed that the adjustable mounting of the bearing members 9 admits of their being adapted for use with crank shafts or other bodies of varying length. The driving discs 12ª are then connected with the power source by means of belts and the said power source put in operation and thereby effecting a rotation of the two mandrels 12 within the ball races 11 carried by their respective bearing members 9. Should the crank-shaft be out of balance, it will partake of an eccentric motion due to centrifugal force overcoming the rigidity of the spring supports 7. In order to counteract this eccentric motion of the crank-shaft the lever 28 and the handles 24ª are operated until the shaft is running without causing movement of the bed 6 relative to the base 8. This counter-action of the out-of-balance of the shaft is effected by the displacement of the weights 15 which are so positioned by means of the levers 28 and handles 14ª that the effective mass of the weights 15 is located at the point of out-of-balance of the shaft. The requisite displacement of the weight is effected by moving the weight in a plane containing a determined diameter of the plane of rotation 12ª and also by varying the relative angular position and the weight of the crank-shaft.

The displacement of the weights along the defined diameter is effected by the rotation of the handles 24ª according to which of the weights it is required to adjust and this operation it will be seen results in the co-operation of the screwed extension 21ª and the screw box in the strap 23, whereby through the collar 21 and the thrust races 19 secured thereto a longitudinal axial sliding motion of the respective shaft 16 is effected. This motion of the shaft 16 causes the projections 15ᵇ on the eccentric weight 15 to slide along the grooves 16ᶜ in the inner end of the shaft 16 according to the direction of the rotation of the handles 24ª and thereby causes the weight 15 to move along a diameter of the plane of rotation. Simultaneously the motion of the lever 28 causes the bushes 32 carried by the annular pins or pegs 30 to traverse the helical grooves 12ᶜ in the mandrels 12 and since the annular members 27 are locked against rotation, the sliding motion imparted to the said annular members 27 effects a rotation of the said mandrels 12 and hence alters the angular relation between the diameter containing the axis of sliding weight and the body under test. Thus the adjustment of the lever 28 and handles 24ª permit the location of the effective mass of the sliding weight at any desired point within the plane of rotation of the body under test. Hence by suitable calibration of the scale carried by the bracket 25 and also of a scale (not shown) co-operating with the lever 28, the amount and actual point of out-of-balance of the rotating body can be determined. When this has been determined metal may be added and taken away in the required amount and the crank-shaft again tested until true running is obtained.

Figure 5:
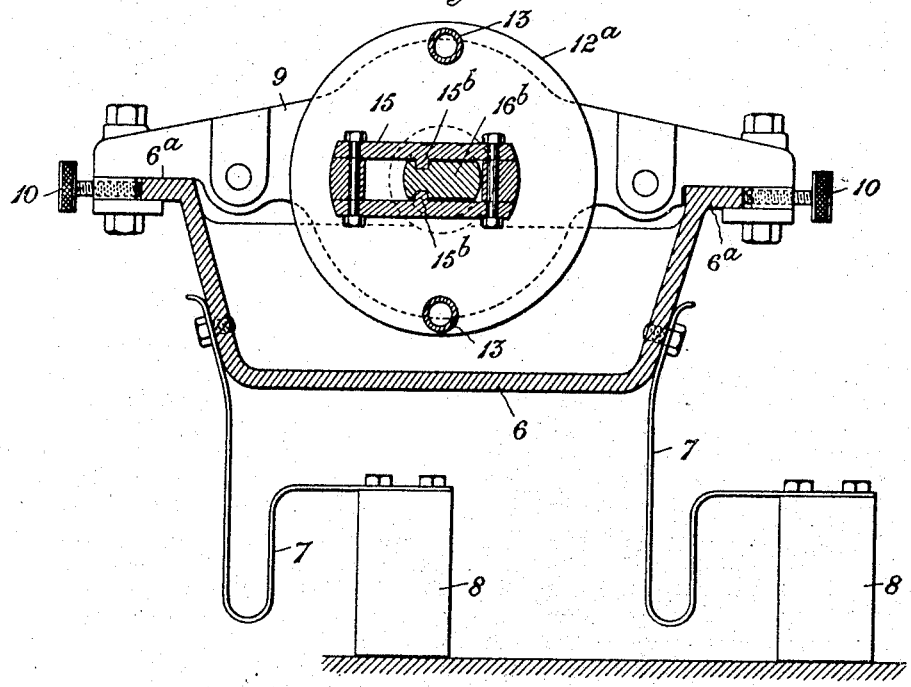
Figure 5 is a part sectional elevation, the section being taken on the line 5—5, Figure 1, and looking in the direction of the arrow in the said figure.

On reference to Figure 5 it will be observed that a different form of spring support 7 is employed from that shown in Figure 1 and it will be readily appreciated that the invention need not be confined to any one form of spring support as any such means which permit of horizontal and vertical motion will suffice.

When the apparatus is employed for testing the balance of the crank-shafts of internal-combustion engines or like engines, additional bearing supports may be provided if the crank-shaft be such as in practice will have more than two bearings, said additional bearings being generally similar to the bearing members 9 and being secured to the bed 6 in a similar manner.

It will thus be observed that the method of testing the balance of rotary bodies as hereinbefore described is greatly superior to such methods as have been devised heretofore in that the new or improved method enables each end of the rotary body to be tested in one operation and also admits of the test being carried out during the rotation of the body and in the virtual conditions which will obtain in practice. In addition, the apparatus is of simple construction and is readily adaptable for testing other forms of rotary bodies such as the rotors of electric motors, fly-wheels, propellers and rotary bodies of all descriptions.

What I claim as my invention and desire to secure by Letters Patent is:—

1. An apparatus for testing the balance of rotary bodies comprising a bed mounted on a plurality of resiliently mounted supports, a pair of hollow mandrels carried by the said bed and adapted for connection to the body to be tested, a pair of shafts secured within said mandrels and axially slidable relatively thereto, eccentrically displaceable weights carried by said shafts and adapted for radial displacement upon an axial movement of said shafts, means for varying the degree of eccentricity of the said weights as occasioned by said radial movement and means for effecting the rotation of the body.

2. An apparatus for testing the balance of rotary bodies comprising a bed mounted on a plurality of resiliently mounted supports, a pair of hollow mandrels carried by said bed and adapted for connection to the body to be tested, a pair of shafts secured within said mandrels and axially slidable relatively thereto, eccentrically displaceable weights carried by said shafts and adapted for a radial displacement upon an axial movement of said shafts, means for varying the degree of eccentricity of the said weights as occasioned by said radial movement, means for effecting the rotation of the body, and means for obtaining an indication of the eccentricity of the displaceable weights.

3. An apparatus for testing the balance of rotary bodies comprising a bed mounted on a plurality of resiliently mounted supports, a pair of bearing members carried by said bed and capable of a sliding motion therein, a pair of hollow mandrels rotatably mounted in said bearing members, a pair of shafts secured within said mandrels and axially slidable relative thereto, displaceable weights slidably mounted on the ends of said shafts and adapted to partake of a radial motion upon an axial movement of the shafts, means for varying the axial movement of the shafts and thereby controlling the degree of eccentricity of the displaceable weights occasioned by the radial motion imparted thereto upon the movement of the said shafts and means for effecting the rotation of the said body.

4. An apparatus for testing the balance of rotary bodies comprising a bed mounted on a plurality of resiliently mounted supports, a pair of hollow mandrels carried by said bed and adapted for connection to the body to be tested, a pair of shafts secured within the said mandrels and capable of an axial sliding motion relatively thereto, eccentrically displaceable weights mounted on the ends of said shafts, and capable of a radial motion upon the axial displacement of said shafts, means for effecting the requisite longitudinal motion of said shafts for determining the degree of eccentricity to be given to said weights and means for effecting the rotation of the body.

5. An apparatus for testing the balance of rotary bodies comprising a bed mounted on a plurality of resiliently mounted supports, a pair of hollow mandrels carried by said bed and adapted for connection to the body to be tested, a pair of shafts located in said mandrels and capable of an axial sliding motion relatively thereto, a pair of diametrically opposed grooves formed in the inner ends of each of said shafts, a pair of eccentrically displaceable weights, projections on said weights adapted to co-operate with the aforesaid grooves whereby upon effecting an axial sliding motion of the said shafts the aforesaid weights can be caused to travel in a radial direction, means for effecting the axial movement of the shafts and means for effecting the rotation of the body.

6. An apparatus for testing the balance of rotary bodies, comprising a bed mounted on a plurality of resiliently mounted supports, a pair of shafts located in said mandrels and capable of an axial sliding motion relatively thereto, a pair of hollow mandrels carried by said bed and adapted for connection to the body to be tested, a plurality of helical grooves formed in the walls of said mandrels, members slidably mounted relatively to the mandrels but incapable of a relative rotation, means located within the said helical grooves adapted to co-operate with bushes for effecting a rotation of the said mandrels relative to the shafts, eccentrically displaceable weights mounted on the ends of said shafts, and capable of a radial motion upon the axial displacement of said shafts, means for effecting the requisite longitudinal motion of said shafts for determining the degree of eccentricity to be given to said weights, and means for effecting the rotation of the body.

7. An apparatus for testing the balance of rotary bodies, comprising a bed mounted on a plurality of resiliently mounted supports, a pair of shafts located in said mandrels and capable of an axial sliding motion relatively thereto, a pair of hollow mandrels carried by said bed and adapted for connection to the body to be tested, a plurality of helical grooves formed in the walls of said mandrels, a pair of longitudinal grooves formed in each of said shafts, means carried by said mandrels for engaging within said longitudinal grooves and thereby preventing rotation of the shafts relatively to the mandrels, means located within said helical grooves adapted to co-operate with bushes for effecting a rotation of the said mandrels relative to the shafts, eccentrically displaceable weights mounted on the ends of said shafts and capable of a radial motion upon the axial displacement of the said shafts, means for effecting the requisite longitudinal motion of said shafts for determining the degree of eccentricity to be given to said weights and means for effecting the rotation of the body.

In witness whereof I have hereunto set my hand.

CHARLES MONTAGUE LINLEY.